United States Patent
Sato et al.

(10) Patent No.: US 7,571,198 B2
(45) Date of Patent: Aug. 4, 2009

(54) DYNAMICALLY RECONFIGURABLE PROCESSOR AND PROCESSOR CONTROL PROGRAM FOR CONTROLLING THE SAME

(75) Inventors: Makoto Sato, Machida (JP); Takanobu Tsunoda, Kokubunji (JP); Masashi Takada, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 158 days.

(21) Appl. No.: 11/593,542

(22) Filed: Nov. 7, 2006

(65) Prior Publication Data

US 2007/0162529 A1   Jul. 12, 2007

(30) Foreign Application Priority Data

Nov. 22, 2005   (JP) .............................. 2005-336924

(51) Int. Cl.
   *G06F 7/38* (2006.01)
(52) U.S. Cl. ...................................................... 708/230
(58) Field of Classification Search .......... 708/230–236
   See application file for complete search history.

(56) References Cited

U.S. PATENT DOCUMENTS 6,226,735 B1 * 5/2001 Mirsky ......................... 712/18
7,092,980 B1 * 8/2006 Mar et al. .................... 708/801
2002/0157066 A1   10/2002 Marshall et al.
2007/0186078 A1 * 8/2007 Ikeda et al. ................... 712/10

FOREIGN PATENT DOCUMENTS

JP   11-251442   9/1999

OTHER PUBLICATIONS

"Dynamically Reconfigurable Processor Implemented with IPFlex's DAPDNA Technology" by Takayuki Sugawara, Keisuke Ide, and Tomoyoshi Sato, IICE Trans. Inf & System, vol. E87-D, No. 8, pp. 1997 to 2003, Aug. 2004.

* cited by examiner

*Primary Examiner*—Tan V Mai
(74) *Attorney, Agent, or Firm*—Antonelli, Terry, Stout & Kraus, LLP.

(57)   ABSTRACT

A dynamically reconfigurable processor is provided having a wiring structure which enables flexible mapping of a program to the processor with a small wiring area. A first wire permits a first arrangement of circuit blocks and a second wire provided for changing the arrangement order of the circuit blocks. A switch is provided to switch between the first wire and the second wire. By virtue of this arrangement, a greater variety of calculations can be performed in the circuit without the necessity for increasing the number of operation blocks.

4 Claims, 16 Drawing Sheets

```
for (i = 0; i < N; i++) {
    v[i] = ( a[i]*x[i] + b[i]*y[i] + 1 )/2
    z[i] = ( a[i]*x[i] - b[i]*y[i] + 1 )/2
}
```

DYNAMICALLY RECONFIGURABLE PROCESSOR AND PROCESSOR CONTROL PROGRAM FOR CONTROLLING THE SAME

CROSS-REFERENCE TO RELATED APPLICATION

The present application claims priority from Japanese Patent Application No. JP 2005-336924 filed on Nov. 22, 2005, the content of which is hereby incorporated by reference into this application.

TECHNICAL FIELD OF THE INVENTION

The present invention relates to a dynamically reconfigurable processor in which a configuration can be dynamically changed. More particularly, it relates to a technology effectively applied to a processor having a plurality of arithmetic circuits and a plurality of wires between the arithmetic circuits as constituent elements.

BACKGROUND OF THE INVENTION

Conventionally, for example, as described in Japanese Patent Application Laid-Open Publication No. 11-251442 (Patent Document 1), a reconfigurable processor device having a plurality of processing devices and a connection matrix which provides interconnection between the plurality of processing devices has been known.

Also, in a conventional dynamically reconfigurable processor composed of different types of arithmetic circuits, wires between arithmetic circuits have been uniform as described in "Dynamically Reconfigurable Processor Implemented with IPFlex's DAPDNA Technology" by Takayuki SUGAWARA, Keisuke IDE, and Tomoyoshi SATO, IICE TRANS. INF. & SYSTEM, Vol. E87-D, No. 8, pp. 1997 to 2003, August 2004 (Non-Patent Document 1).

In such a processor, wires between arithmetic circuits are interconnection buses composed of uniform buses in two directions such as X buses and Y buses, and routing between a data transfer source arithmetic circuit and a data transfer destination arithmetic circuit is controlled by selecting wires included in the X bus or the Y bus by a switch box. The function of the switch box is set by a configuration which is programmed in advance.

The reason why different types of arithmetic circuits are provided in the above-described manner in a dynamically reconfigurable processor in which a large number of arithmetic circuits are two-dimensionally disposed is to improve the operating rate of the arithmetic circuits.

If all the arithmetic circuits have the same function and can be adapted to various types of operations such as addition/subtraction, multiplication, and logic operations, a program can be readily mapped to this arithmetic circuit array. However, for example, if a program including only a small amount of multiplications and including many addition/subtraction and logic operations is to be mapped to this processor, many of multiplications which require a large area are not utilized, and utilization efficiency of the circuit area is bad. This is not preferable because increase in the area of an LSI leads to increase in the cost of the LSI. Therefore, it is important to improve the operating rate of the arithmetic circuits in as small area as possible. One solution for this purpose is to provide an arithmetic circuit array composed of nonuniform arithmetic circuits, wherein a certain arithmetic circuit includes only the operations consisting mainly of multiplications and another arithmetic circuit includes the operations consisting mainly of additions/subtractions and logic operations. In such a processor, many wires are sometimes provided for improving simplicity of programming. As a result, even when necessary arithmetic is located at a distant position, the arithmetic circuit thereof can be readily utilized by use of the abundant wires.

SUMMARY OF THE INVENTION

In the above-described technology, however, in order to flexibly map a program to a dynamically reconfigurable processor having a nonuniform configuration composed of, for example, two types of arithmetic circuits A and B, wherein most of them are the arithmetic circuits A and the rest of them are the arithmetic circuits B which are disposed to be adjacent to each other, more wires have to be added compared with a dynamically reconfigurable processor composed of uniform arithmetic circuits, and there is a problem that a larger wiring area is consumed as a whole.

More specifically, wires have to be added not only in the vicinity of the arithmetic circuits B but also in the entire processor since the wiring structure has to be uniform.

An object of the present invention is to provide a dynamically reconfigurable processor having a wiring structure which enables flexible mapping of a program to the processor in a small wiring area and a processor control program which controls the same.

The typical ones of the inventions disclosed in this application will be briefly described as follows.

A dynamically reconfigurable processor according to the present invention comprises: an arithmetic circuit group Ui composed of arithmetic circuits of a type Ai (i=1, 2, ..., N); an arithmetic circuit group Vi composed of a part of arithmetic circuits which are included in the arithmetic circuit group Ui and an arithmetic circuit group of a type B which is connected thereto and different from the arithmetic circuit of the type Ai; inter-arithmetic-circuit wires Xi mutually connecting the arithmetic circuits of the type Ai and the arithmetic circuits of the type B; and a switch group Si which causes the inter-arithmetic-circuit wires Xi in the arithmetic circuit group Vi to be inter-arithmetic-circuit wires different from other inter-arithmetic-circuit wires Xi and changes a connection order between the arithmetic circuits in the arithmetic circuit group Vi.

Also, a dynamically reconfigurable processor according to the present invention comprises: an arithmetic circuit group Ui composed of arithmetic circuits of a type Ai (i=1, 2, ..., N); an arithmetic circuit group Vi composed of a part of arithmetic circuits which are included in the arithmetic circuit group Ui and an arithmetic circuit group of a type B which is connected thereto and different from the arithmetic circuit of the type Ai; inter-arithmetic-circuit wires Xi mutually connecting the arithmetic circuits of the type Ai and the arithmetic circuits of the type B; wires Zi which are added to the inter-arithmetic-circuit wires Xi so as to mutually connect the arithmetic circuits in the arithmetic circuit group Vi in an order different from that of the inter-arithmetic-circuit wires Xi; and a switch group Si which causes either one of the inter-arithmetic-circuit wire Xi or the wire Zi to be active.

Further, a processor control program according to the present invention controls a dynamically reconfigurable processor comprising: an arithmetic circuit group Ui composed of arithmetic circuits of a type Ai (i=1, 2, ..., N); an arithmetic circuit group Vi composed of a part of arithmetic circuits which are included in the arithmetic circuit group Ui and an arithmetic circuit group of a type B which is connected thereto and different from the arithmetic circuit of the type Ai;

inter-arithmetic-circuit wires Xi mutually connecting the arithmetic circuits of the type Ai and the arithmetic circuits of the type B; wires Zi which are added to the inter-arithmetic-circuit wires Xi so as to mutually connect the arithmetic circuits in the arithmetic circuit group Vi in an order different from that of the inter-arithmetic-circuit wires Xi; and a switch group Si which causes either one of the inter-arithmetic-circuit wire Xi or the wire Zi to be active, wherein, based on information of a logical circuit configuration for operating the dynamically reconfigurable processor, the switch group Si is controlled to change the connection order of the arithmetic circuits of the type Ai and the arithmetic circuits of the type B.

Furthermore, a processor control program according to the present invention controls a dynamically reconfigurable processor comprising: an arithmetic circuit group Ui composed of arithmetic circuits of a type Ai (i=1, 2, . . . , N); an arithmetic circuit group Vi composed of a part of arithmetic circuits which are included in the arithmetic circuit group Ui and an arithmetic circuit group of a type B which is connected thereto and different from the arithmetic circuit of the type Ai; inter-arithmetic-circuit wires Xi mutually connecting the arithmetic circuits of the type Ai and the arithmetic circuits of the type B; wires Zi which are added to the inter-arithmetic-circuit wires Xi so as to mutually connect the arithmetic circuits in the arithmetic circuit group Vi in an order different from that of the inter-arithmetic-circuit wires Xi; a switch group Si which causes either one of the inter-arithmetic-circuit wire Xi or the wire Zi to be active; and a switch group Ti which changes the inter-arithmetic-circuit wires mutually connecting couples composed of the arithmetic circuits of the type Ai and the arithmetic circuits of the type B connected by the inter-arithmetic-circuit wires Xi in the arithmetic circuit group Vi, wherein, based on information of a logical circuit configuration for operating the dynamically reconfigurable processor, the switch group Si is controlled to change the connection order of the arithmetic circuits of the type Ai and the arithmetic circuits of the type B, and the switch group Ti is controlled in association with a control signal of the switch group Si to change the inter-arithmetic-circuit wires mutually connecting couples composed of the arithmetic circuits of the type Ai and the arithmetic circuits of the type B connected by the inter-arithmetic-circuit wires Xi in the arithmetic circuit group Vi, in association with a state of the switch group Si.

The effects obtained by typical aspects of the present invention will be briefly described below.

According to the present invention, a program can be flexibly mapped to a dynamically reconfigurable processor composed of nonuniform arithmetic circuit groups with small increase in the wiring area.

BRIEF DESCRIPTIONS OF THE DRAWINGS

Figure 19A:
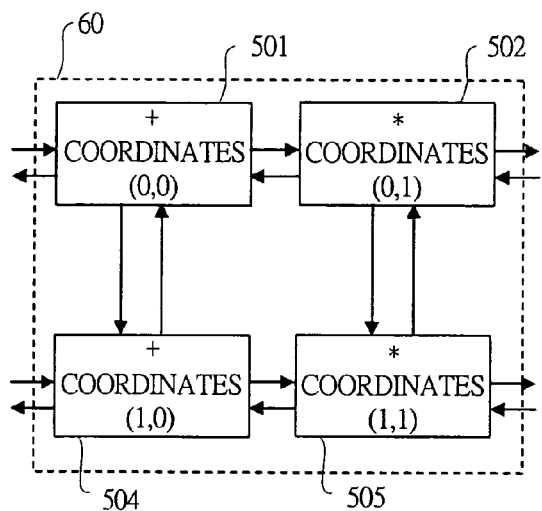
FIG. 19A is a diagram showing the logical circuit configuration that the programmer can select in the dynamically reconfigurable processor according to the second embodiment of the present invention.
Figure 19B:
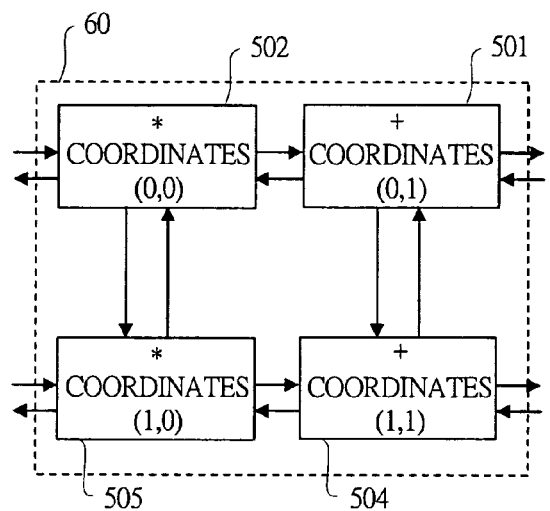
FIG. 19B is a diagram showing the logical circuit configuration that the programmer can select in the dynamically reconfigurable processor according to the second embodiment of the present invention.
Figure 19C:
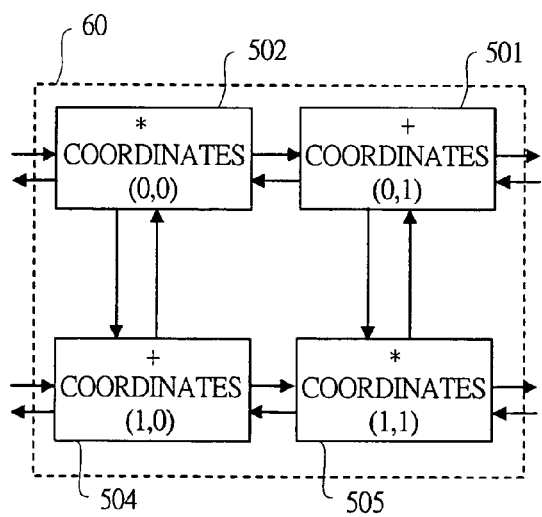
Figure 19D:
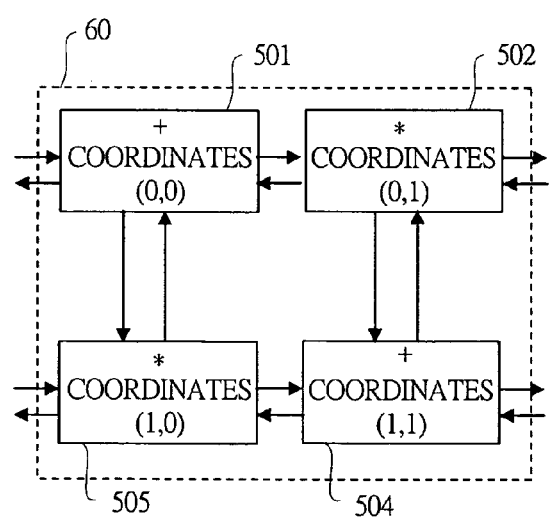

FIG. 19C is a diagram showing the logical circuit configuration that the programmer can select in the dynamically reconfigurable processor according to the second embodiment of the present invention; and FIG. 19D is a diagram showing the logical circuit configuration that the programmer can select in the dynamically reconfigurable processor according to the second embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

<Summary of Dynamically Reconfigurable Processor>

Figure 1:
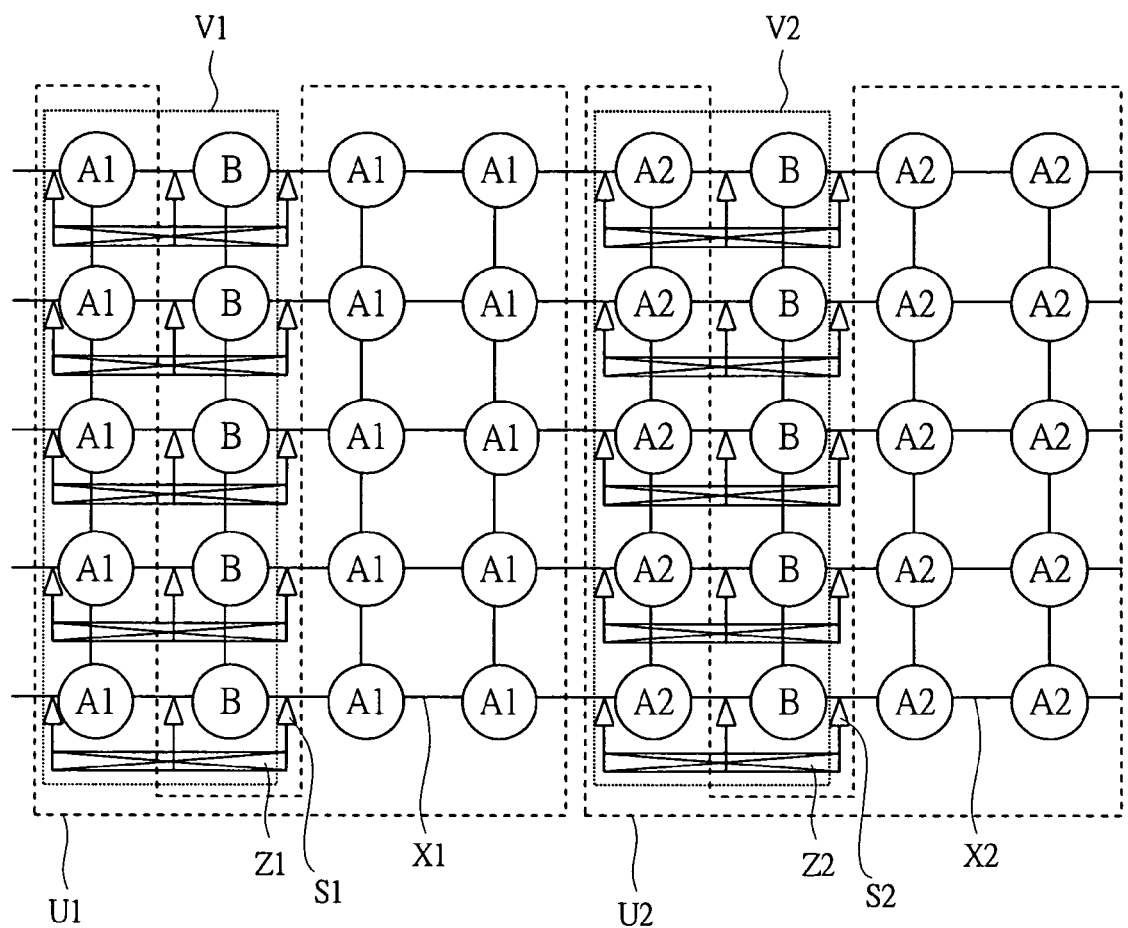
FIG. 1 is an explanatory drawing for describing the summary of a dynamically reconfigurable processor according to the first embodiment of the present invention.

A summary of a dynamically reconfigurable processor according to a first embodiment of the present invention will be described with reference to FIG. 1. FIG. 1 is an explanatory drawing for describing the summary of the dynamically reconfigurable processor according to the first embodiment of the present invention.

In FIG. 1, Ai (i=1, 2, ..., N) is an arithmetic circuit of a type Ai, B is an arithmetic circuit of a type B which is different from the arithmetic circuit of the type Ai, Ui is a group of some arithmetic circuits composed of the arithmetic circuits of the type Ai, Vi is a group of a part of the arithmetic circuits included in the arithmetic circuit group Ui and the arithmetic circuits of the type B connected thereto, Xi is an inter-arithmetic-circuit wire, Zi is a wire added to the inter-arithmetic-circuit wire Xi and is a wire which mutually connects the arithmetic circuits in the arithmetic circuit group Vi in an order different from that of the inter-arithmetic-circuit wire Xi, and Si is a switch added to the wires Xi and is a switch which causes either one of the inter-arithmetic-circuit wire Xi or the wire Zi to be active.

As shown in FIG. 1, the dynamically reconfigurable processor of this embodiment has a configuration in which, among the arithmetic circuits of the type Ai, the arithmetic circuits of the type B which are different from the arithmetic circuits of the type Ai are present, and the arithmetic circuits of the type Ai and the arithmetic circuits of the type B are wired in matrix with the inter-arithmetic-circuit wires xi.

Also, the wires Zi which change the order of connection of the arithmetic circuits of the type Ai and the arithmetic circuits of the type B are provided for the inter-arithmetic-circuit wires Xi which connect the arithmetic circuits of the type Ai and the arithmetic circuits of the type B, and by controlling the switch group Si, the connecting destinations of the arithmetic circuits of the type B can be changed in the wires in matrix.

The switch group Si is controlled by, for example, process of a processor control program or the like which controls the dynamically reconfigurable processor.

By this means, the order of the arithmetic circuits of the type Ai and the arithmetic circuits of the type B can be changed in accordance with needs, and a program can be flexibly mapped to the dynamically reconfigurable processor with small increase in the wiring area.

<Configuration of a System Including Dynamically Reconfigurable Processor>

Figure 2:
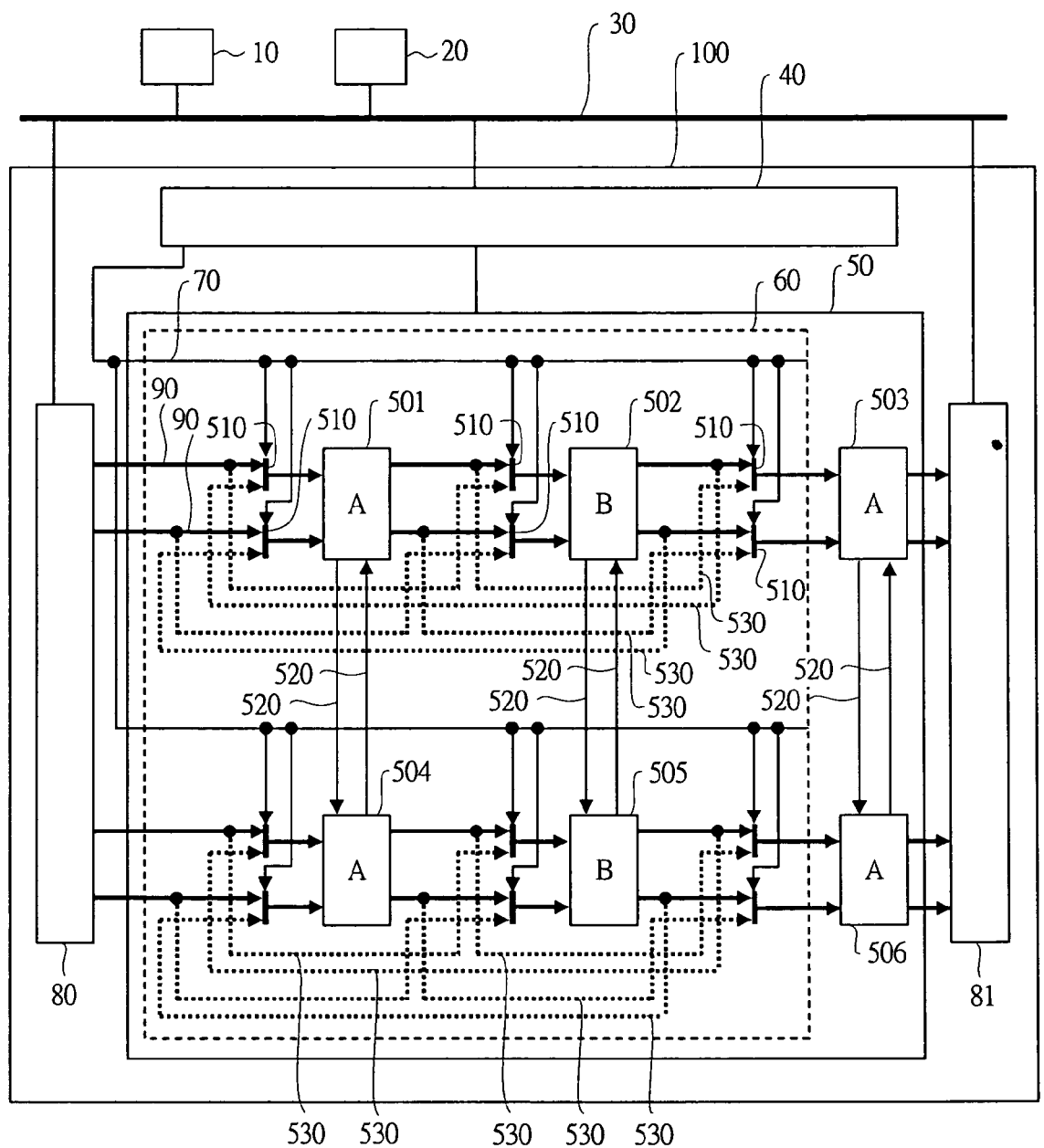
FIG. 2 is a configuration diagram showing the configuration of a system including the dynamically reconfigurable processor according to the first embodiment of the present invention.
Figure 3:
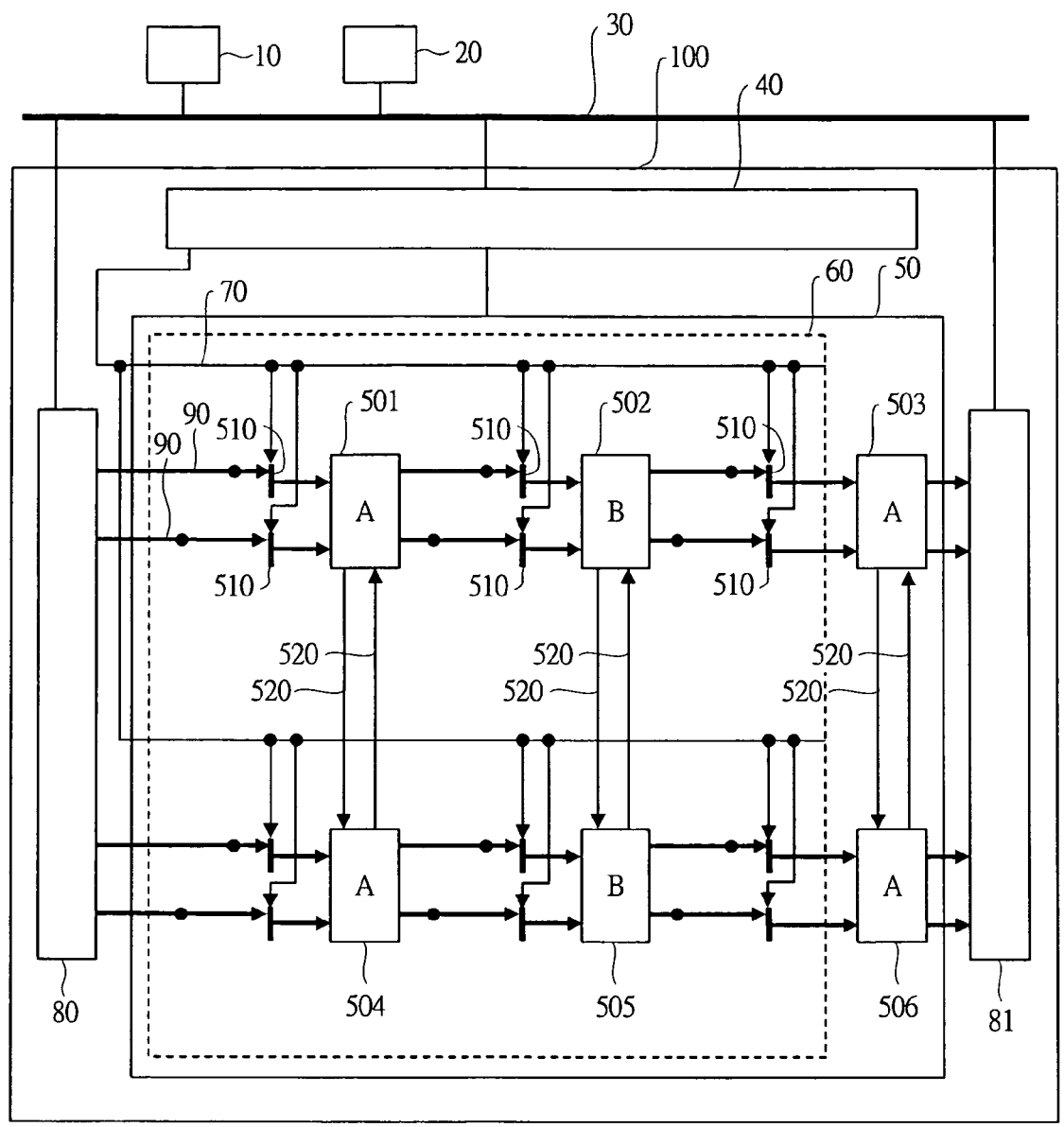
FIG. 3 is a diagram showing active wires in the case where the wire switching switches of the dynamically reconfigurable processor according to the first embodiment of the present invention select an upper-side input.
Figure 4:
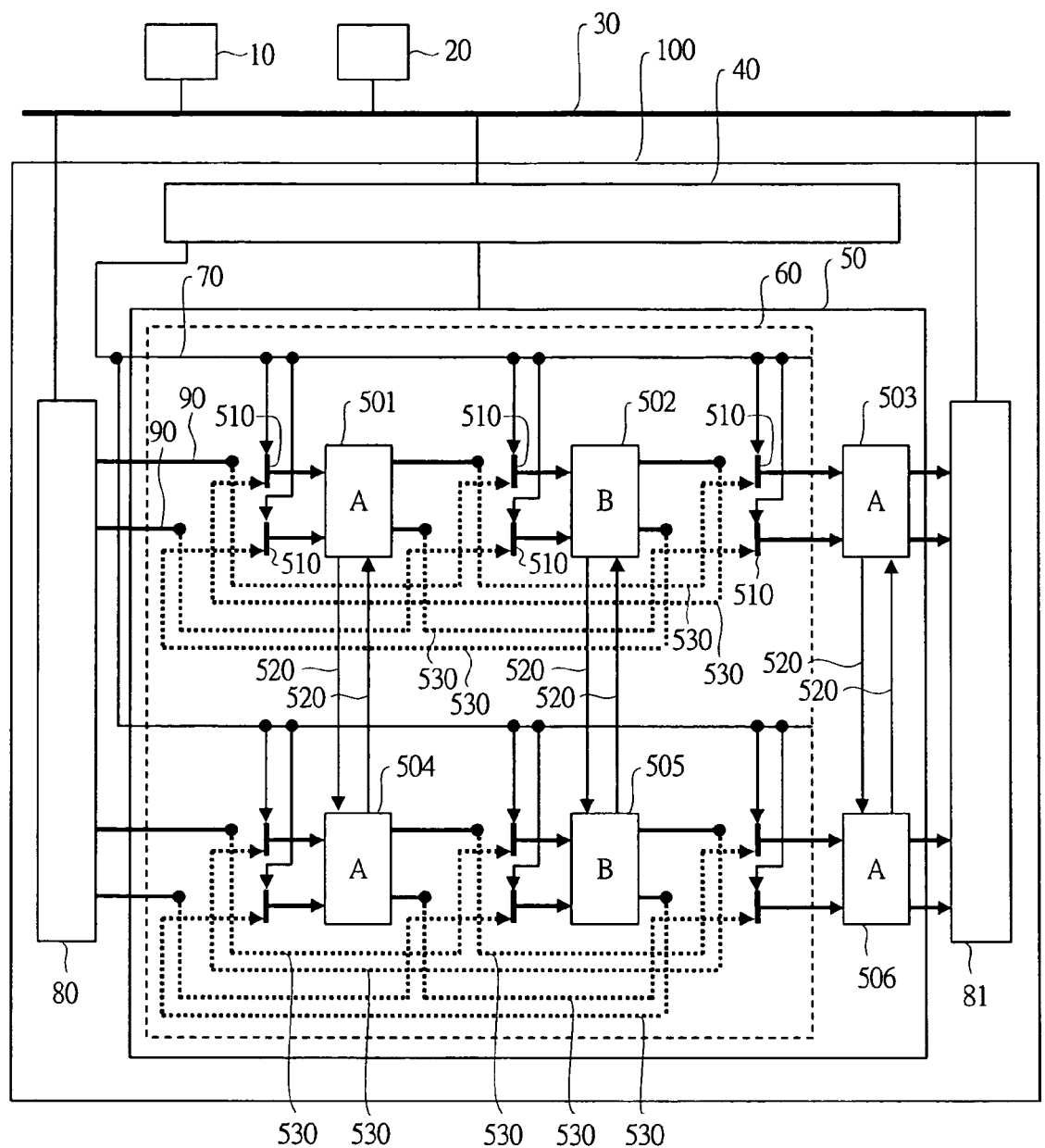
FIG. 4 is a diagram showing active wires in the case where the wire switching switches of the dynamically reconfigurable processor according to the first embodiment of the present invention select a lower-side input.

Next, a system configuration including the dynamically reconfigurable processor according to the first embodiment of the present invention will be described with reference to FIG. 2 to FIG. 4. FIG. 2 is a configuration diagram showing the configuration of the system including the dynamically reconfigurable processor according to the first embodiment of the present invention, FIG. 3 is a diagram showing active wires in the case where the wire switching switches of the dynamically reconfigurable processor according to the first embodiment of the present invention select upper-side input, and FIG. 4 is a diagram showing active wires in the case where the wire switching switches of the dynamically reconfigurable processor according to the first embodiment of the present invention select lower-side input.

In FIG. 2, the system including the dynamically reconfigurable processor is composed of a CPU 10, a main memory 20, a bus 30, and the dynamically reconfigurable processor 100.

The dynamically reconfigurable processor 100 is composed of: a configuration management unit 40 which manages a configuration which is information representing the configuration of the dynamically reconfigurable processor; an arithmetic circuit array unit 50 in which two types of arithmetic circuits 501 to 506, which are represented by A and B and six in total, are two-dimensionally arranged; the arithmetic circuits 501, 503, 504, and 506 of the type A; the arithmetic circuits 502 and 505 of the type B which is different from the type A; wire switching switches 510 each of which selects the data on either one of wires from the data on the wires represented by two arrows on the left side of each of the switches and supplies the data to the wire on the right side of the switch 510; vertical-direction inter-arithmetic-circuit wires 520 which connect the arithmetic circuits to each other in the vertical direction; additionally provided wires (dot-line part) 530; an additionally-provided wire part (broken-line part) 60 representing the part in which the wires are additionally provided in the arithmetic circuit array unit 50; arithmetic circuit position changing wires 70 which control switching of the wire switching switches 510; local memories 80 and 81; and data wires 90.

The wiring of the additionally-provided wire part 60 including the additionally provided wires 530 and the wiring of the arithmetic circuit array unit (the part including the arithmetic circuits 503 and 506) other than that are different from each other. Therefore, it can be understood that the wiring is not uniform when the arithmetic circuit array unit 50 is viewed as a whole.

The active wires in the case where the wire switching switches 510 select the upper-side input in FIG. 2 can be shown in a diagram of FIG. 3, in which the wires 530 shown in FIG. 2 are eliminated. In this case, the six arithmetic circuits are simply connected in the vertical direction and the horizontal direction.

Also, in the case where the wire switching switches 510 select the lower-side input in FIG. 2, the wires 530 shown in FIG. 2 becomes the active wires as shown in FIG. 4. In this case, the six arithmetic circuits are connected in the manner described below.

First, the connection of the upper-side arithmetic circuits 501, 502, and 503 will be described.

The data inputted from the left-side local memory 80 is inputted to the arithmetic circuit 502, then inputted to the arithmetic circuit 501, and finally inputted to the arithmetic circuit 503.

Similarly in the lower-side arithmetic circuits, the data inputted from the left-side local memory 80 is inputted to the arithmetic circuit 505, then inputted to the arithmetic circuit 504, and finally inputted to the arithmetic circuit 506.

Meanwhile, regarding the connection in the vertical direction, the arithmetic circuits 501 and 502 are always connected to the arithmetic circuits 504 and 505, respectively, regardless of the operation of the wire switching switches 510.

As described above, it can be understood that the positions of the arithmetic circuits in the first column are switched with those of the arithmetic circuits in the second column in the connection when the wire switching switches 510 select the lower-side input.

This means that the arithmetic circuits of the type B appear to be in the first column for a programmer.

In other words, it can be understood from FIG. 3 and FIG. 4 that the programmer can control the arithmetic circuits of the type B to be logically in the first column or the second column by switching the wire switching switches 510.

<Mapping of Program of Dynamically Reconfigurable Processor>

Figure 5A:
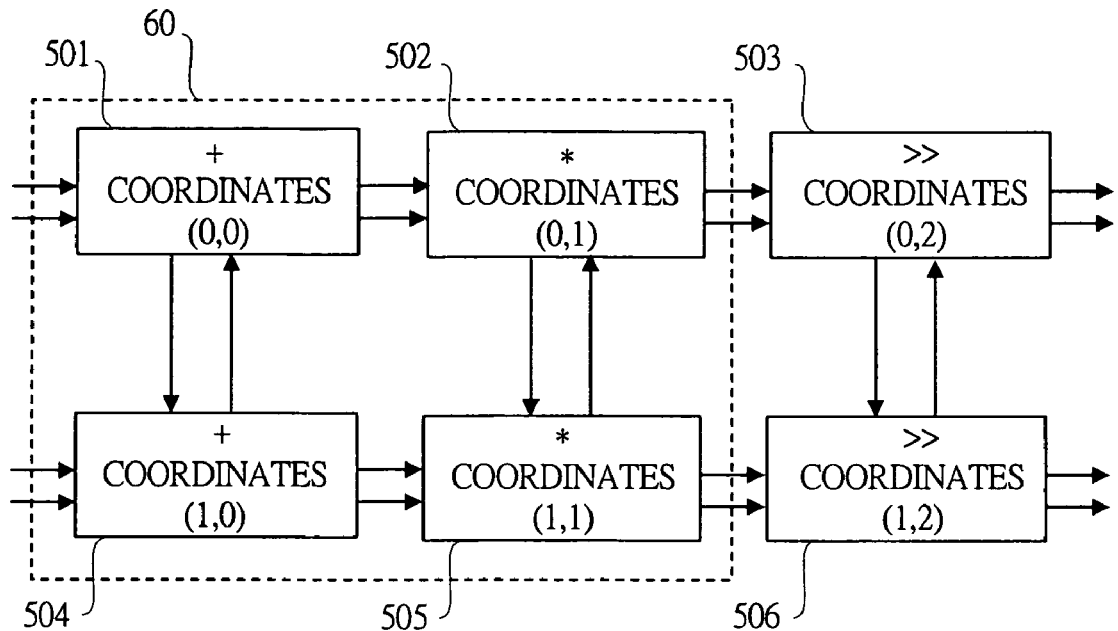
FIG. 5A is a diagram showing an example of logical circuit configuration that a programmer can select in the dynamically reconfigurable processor according to the first embodiment of the present invention.
Figure 5B:
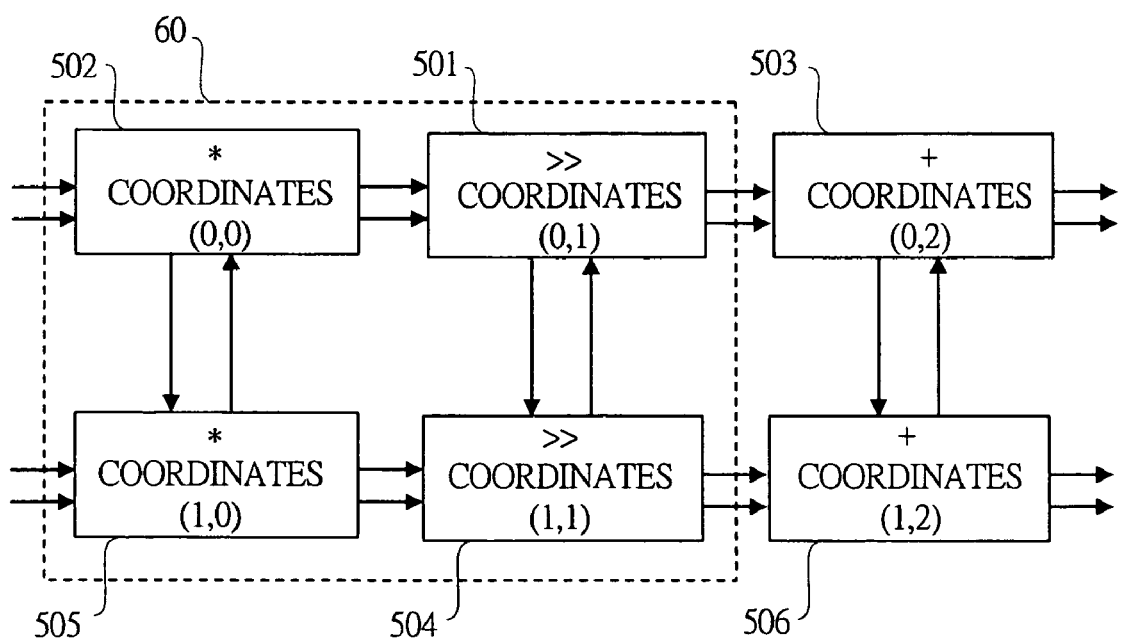
FIG. 5B is a diagram showing an example of logical circuit configuration that a programmer can select in the dynamically reconfigurable processor according to the first embodiment of the present invention.
Figure 6:
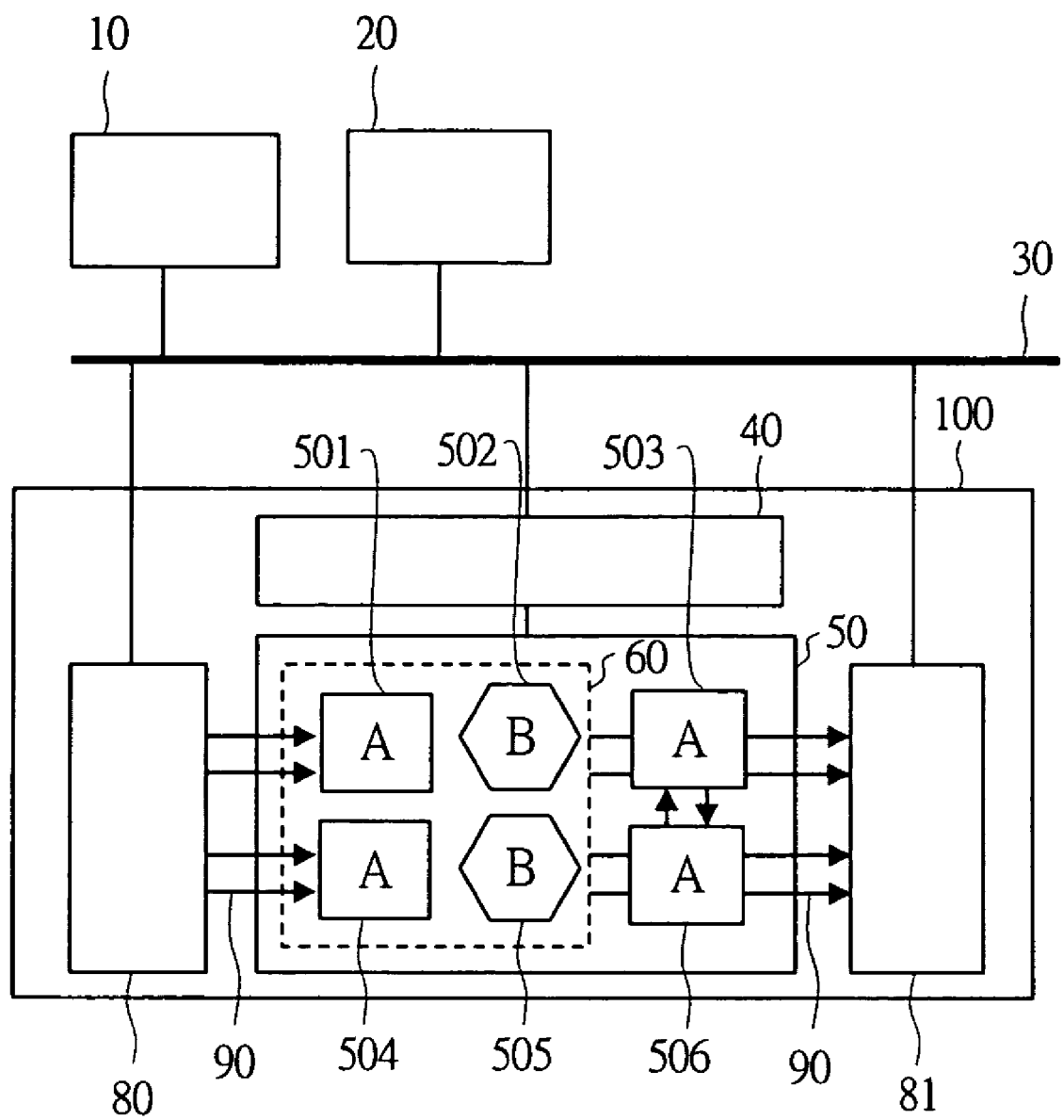
FIG. 6 is a diagram showing a simple display example of the dynamically reconfigurable processor according to the first embodiment of the present invention.
Figure 7A:
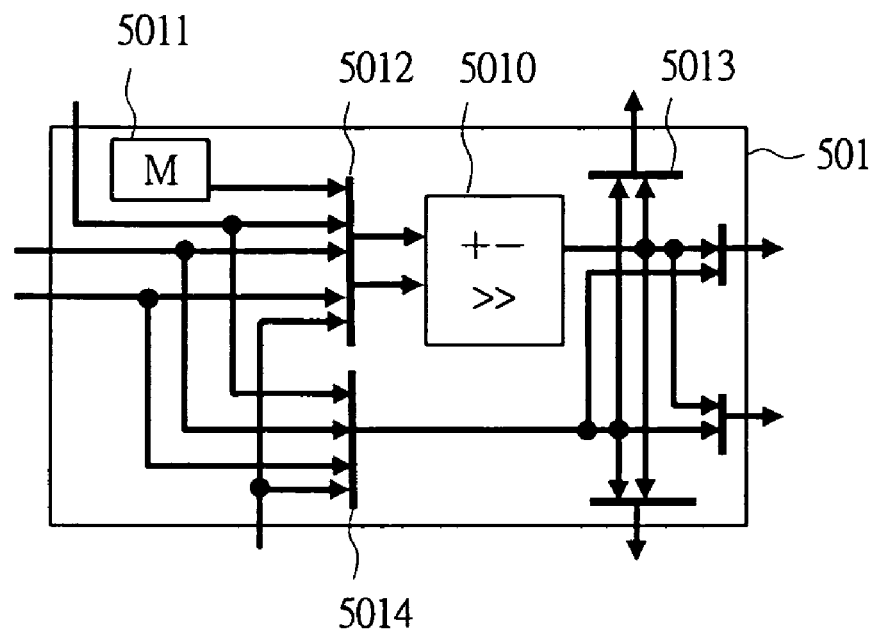
FIG. 7A is a diagram showing an example of the structure of the arithmetic circuit and the wiring structure in the arithmetic circuit in the dynamically reconfigurable processor according to the first embodiment of the present invention.
Figure 7B:
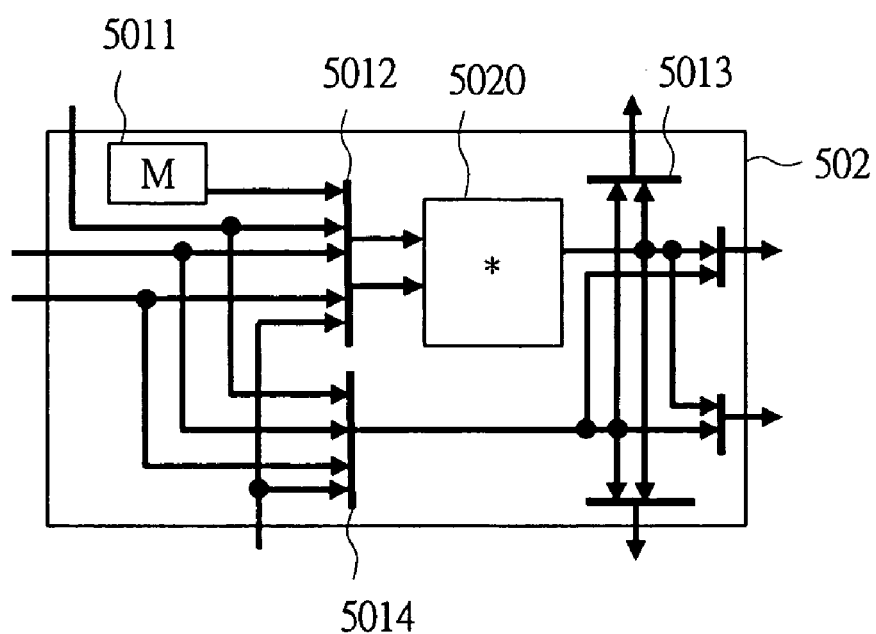
FIG. 7B is a diagram showing an example of the structure of the arithmetic circuit and the wiring structure in the arithmetic circuit in the dynamically reconfigurable processor according to the first embodiment of the present invention.
Figures 8, 9:
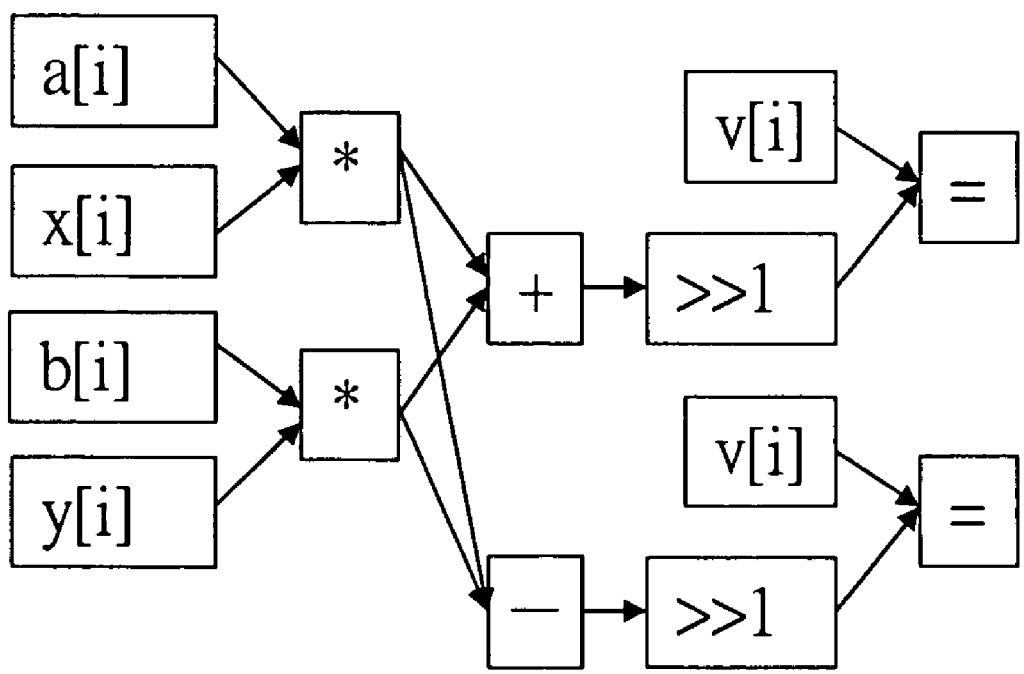
FIG. 8 is a diagram showing an example of a program of the dynamically reconfigurable processor according to the first embodiment of the present invention.
FIG. 9 is a diagram showing a control data flow graph (CDFG) for the program shown in FIG. 8 in the dynamically reconfigurable processor according to the first embodiment of the present invention.
Figure 10:
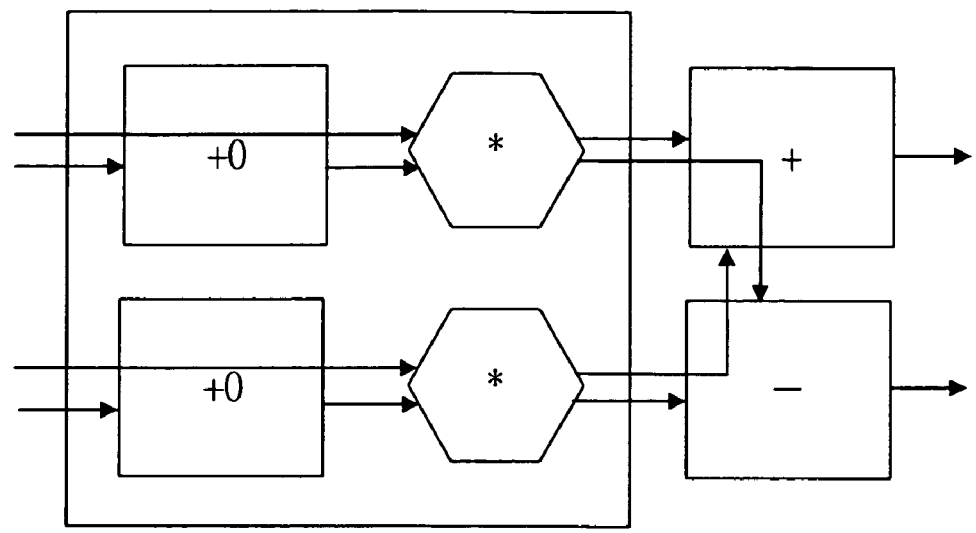
FIG. 10 is a diagram showing a failure example of mapping of the CDFG of FIG. 9 to the dynamically reconfigurable processor in the case where multipliers are in the second column in the dynamically reconfigurable processor according to the first embodiment of the present invention.
Figure 11:
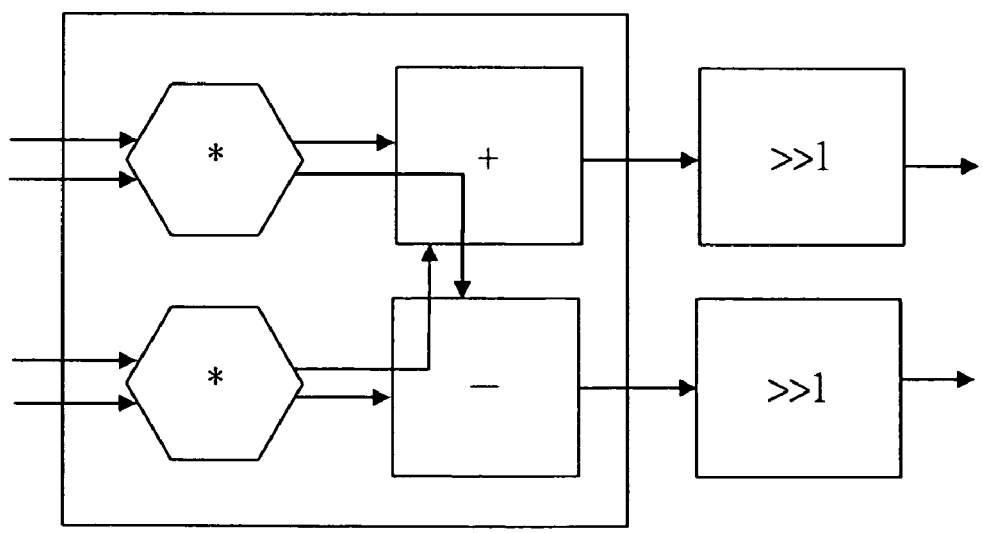
FIG. 11 is a diagram showing an example of mapping of the CDFG of FIG. 9 to the dynamically reconfigurable processor in the case where the multipliers are in the first column in the dynamically reconfigurable processor according to the first embodiment of the present invention.

Next, mapping of a program of the dynamically reconfigurable processor according to the first embodiment of the present invention will be described with reference to FIGS. 5 to FIG. 11. FIGS. 5A and 5B are diagrams showing examples of logical circuit configurations that the programmer can select in the dynamically reconfigurable processor according to the first embodiment of the present invention. FIG. 5A shows the circuit configuration of the case shown in FIG. 3 in which the wire switching switches 510 select the upper-side input, and FIG. 5B shows the circuit configuration of the case shown in FIG. 4 in which the wire switching switches 510 select the lower-side input. FIG. 6 is a diagram showing a simple display example of the dynamically reconfigurable processor according to the first embodiment of the present invention, FIGS. 7A and 7B are diagrams showing examples of the structure of the arithmetic circuits and the wiring structure in the arithmetic circuits in the dynamically reconfigurable processor according to the first embodiment of the present invention, FIG. 8 is a diagram showing an example of the program of the dynamically reconfigurable processor according to the first embodiment of the present invention, FIG. 9 is a diagram showing a control data flow graph (CDFG) for the program shown in FIG. 8 in the dynamically reconfigurable processor according to the first embodiment of the present invention, FIG. 10 is a diagram showing a failure example of mapping of the CDFG of FIG. 9 to the dynamically reconfigurable processor in the case where multipliers are in the second column in the dynamically reconfigurable processor according to the first embodiment of the present invention, and FIG. 11 is a diagram showing a mapping example of the CDFG of FIG. 9 to the dynamically reconfigurable processor in the case where the multipliers are in the first column in the dynamically reconfigurable processor according to the first embodiment of the present invention.

In FIGS. 5A and 5B, it is presupposed that addition/subtraction and logical operations can be performed by the arithmetic circuits of the type A, and multiplication can be performed by the arithmetic circuits of the type B.

Herein, FIG. 5A shows that a calculation expression which performs addition/subtraction, multiplication, and finally a logical operation (represented by right shift ">>") to the input data can be readily mapped to the arithmetic circuit array.

On the other hand, FIG. 5B shows that a calculation expression which performs multiplication, addition/subtraction, and finally a logic operation to input data can be readily mapped to the arithmetic circuit array.

A simple display example of such dynamically reconfigurable processor is shown in FIG. 6. In order to facilitate the understanding, the arithmetic circuits B are represented by hexagons. The wires between the arithmetic circuits except for those which are necessary are omitted.

Hereinafter, mapping of a specific program will be shown by use of the arithmetic circuit array unit 50 of FIG. 6 so as to show the effectiveness of this embodiment.

First of all, the internal structures of the arithmetic circuits are the configurations as shown in FIGS. 7A and 7B. FIG. 7A shows the arithmetic circuit of the type A which is typified by 501 in FIG. 2.

The arithmetic circuit 501 of the type A has an ALU 5010 which can execute addition/subtraction and a logical operation and can select one of the operations by the configuration thereof.

A constant is stored in a memory 5011. Setting of the constant is performed by configuration.

Moreover, switches as follows are provided, that is: a wire switching switch 5012 which selects data on any two wires from the data on the wires represented by five arrows on the left side thereof and supplies the data to the wires which are adjacent to the right side of 5012; a wire switching switch 5013 which selects data on any one wire from the data on the wires represented by two arrows on the lower side thereof and supplies the data to a wire adjacent to the upper side of 5013; and a wire switching switch 5014 which selects data on any one wire from the data on the wires represented by four arrows on the left side thereof and supplies the data to the wire adjacent to the right side of 5014.

The wire connected to the wire switching switch 5014 is a through wire and is used for transferring data to another arithmetic circuit via the arithmetic circuit 501.

In this manner, two inputs can be selected from among the one input from the upper side, two inputs from the left side, and one input from the lower side to perform an operation, and the operation result can be outputted to arbitrary wires among the one upper-side wire, two right-side wires (output of the same operation result), and the one lower-side wire. Also, one input can be selected among the one input from the upper side, two inputs from the left side, and one input from the lower side, and it can be outputted to an arbitrary wire other than the wire used for outputting the operation result among the one upper-side wire, two right-side wires, and the one lower-side wire.

Also, FIG. 7B shows the arithmetic circuit of the type B which is typified by 502 in FIG. 2.

The arithmetic circuit 502 of the type B has an ALU 5020 which can execute multiplication, and the operation thereof is controlled by configuration. The part other than that is the same as the configuration of the arithmetic circuit 501 of the type A shown in FIG. 7A.

An example of the program is that shown in FIG. 8, in which a first line is a for loop, the value of a variable i is increased from 0 one by one, and the processes of a second line and a third line are repeated until the value reaches N−1 (N is a certain constant).

The second line represents to obtain the sum of the result of multiplication of the values of i-th elements of arrays a and x and the result of multiplication of the values of the i-th elements of arrays b and y, divide the value obtained by adding 1 to the sum by 2, and then, substitute the obtained result for an array v.

The third line represents to obtain a difference between the result of multiplication of the values of the i-th elements of the arrays a and x and the result of multiplication of the values of the i-th elements of arrays b and y, divide the value obtained by adding 1 to the difference by 2, and then, substitute the obtained result for the array v.

A control data flow graph (CDFG) for the program shown in FIG. 8 is that shown in FIG. 9.

In FIG. 9, each rectangle represents data or an operation. Multiplication is represented by "*", addition is represented by "+", subtraction is represented by "−", and division by two is represented by one-bit right shift ">>1". Arrows represent flows of data.

Since the result of the multiplication of the values of the i-th elements of the arrays a and x is utilized in addition and subtraction, the multiplication result is utilized for both "+" and "−".

Mapping of the control data flow graph (CDFG) shown in FIG. 9 will be described here.

As shown in FIG. 10, in mapping of the CDFG of FIG. 9 to a dynamically reconfigurable processor in the case where multipliers are in the second column, the mapping is a failure because the right shift is not mapped although the two multiplications and addition/subtraction are mapped.

Inputs to the multiplication are represented by two arrows from the left side; wherein the upper one represents a through wire and the lower one represents the outputting of an operation result of a constant 0 stored in a memory and input data to the right side. The latter one represents to transfer the same result as the case where a through wire is used, i.e., transfer the input data without change. Thus, effects similar to the case of two through wires can be obtained.

The bent arrows in the arithmetic circuits including addition/subtraction represent through wires which transfer the data inputted from the left side to the lower side (in the case of addition) or to the upper side (in the case of subtraction).

As shown in FIG. 11, in the mapping of the CDFG of FIG. 9 to the dynamically reconfigurable processor in the case where the multipliers are in the first column, the mapping is successful.

As shown in FIG. 10 and FIG. 11, it can be understood that, when the logical circuit configuration is changed by using the wire switching switches 510, flexibility of the dynamically reconfigurable processor is increased, and the program which cannot be mapped in the case where the arithmetic circuits of the type B are logically in the first column can be mapped when the arithmetic circuit of the type B is logically placed in the second column.

<Comparison with Conventional Dynamically Reconfigurable Processors>

Figure 12:
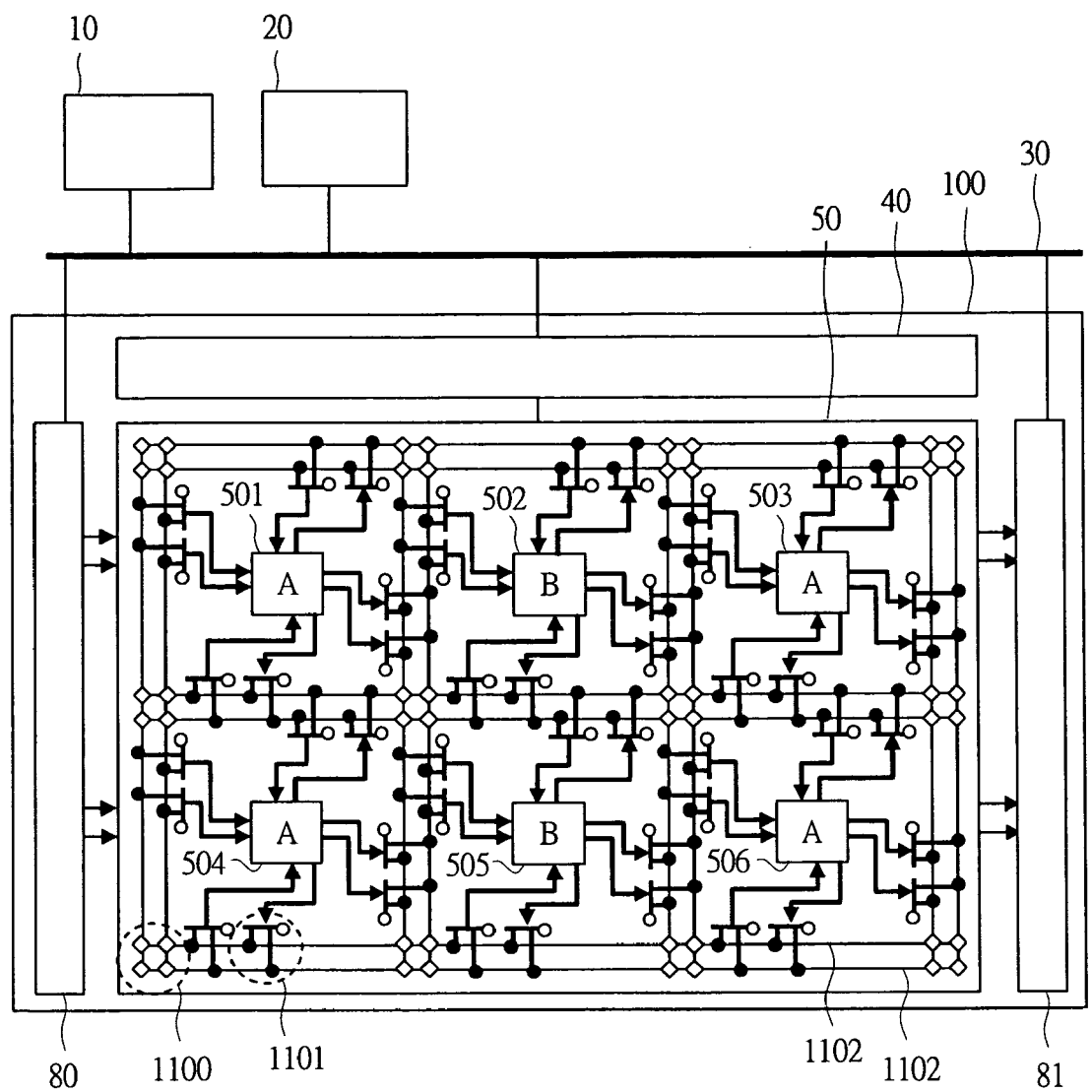
FIG. 12 is a diagram showing an example of a conventional dynamically reconfigurable processor as a comparative example.
Figure 13A:
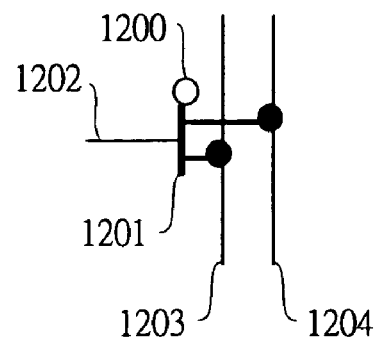
FIG. 13A is a diagram showing a structure of a wiring switch in FIG. 12.
Figure 13B:
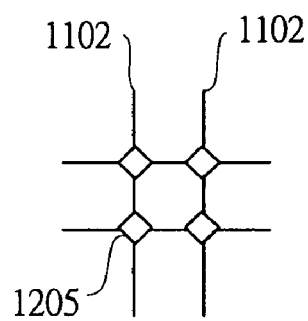
FIG. 13B is a diagram showing a structure of a wiring switch in FIG. 12.
Figure 13C:
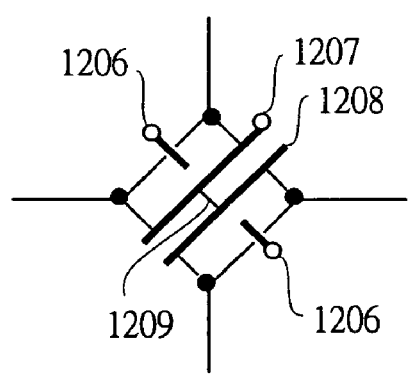
FIG. 13C is a diagram showing a structure of a wiring switch in FIG. 12.
Figure 14:
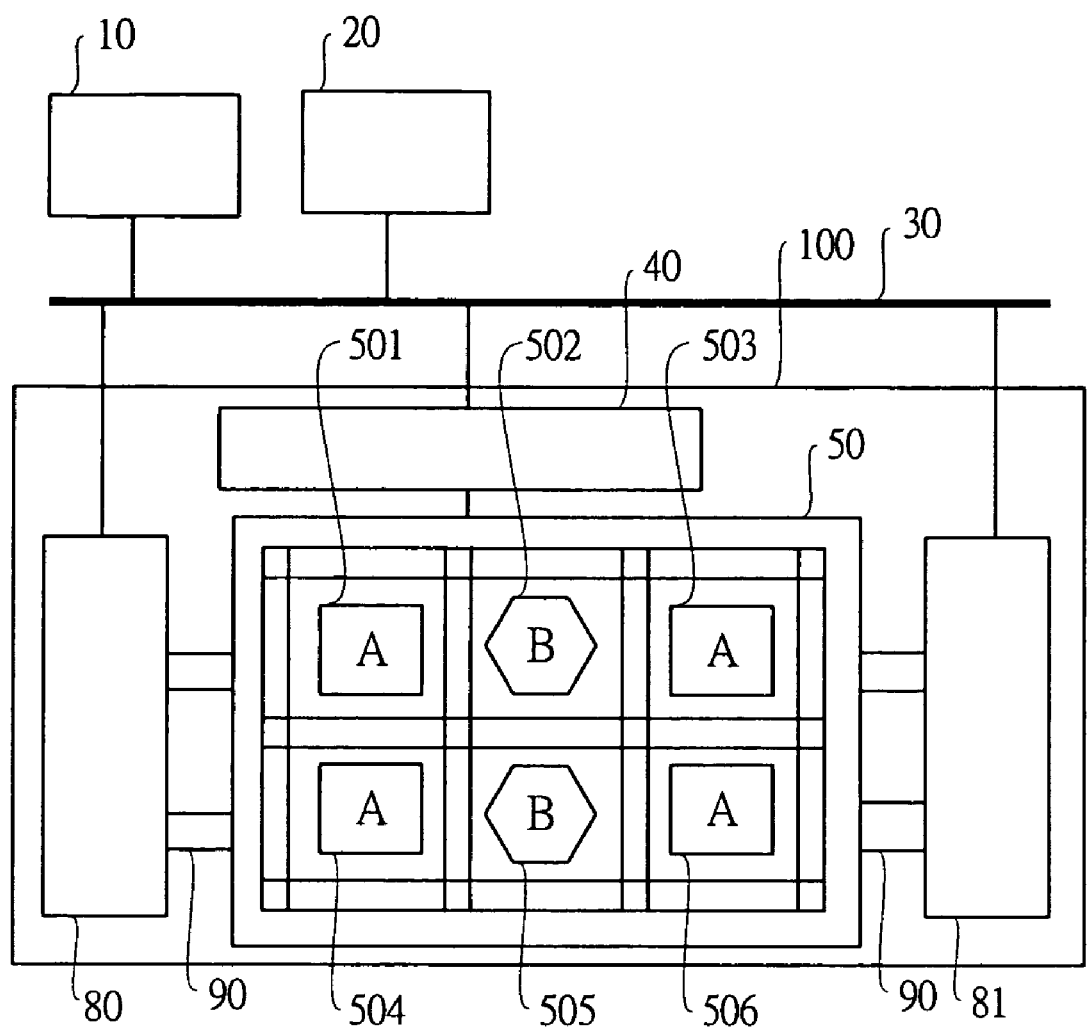
FIG. 14 is a diagram showing a simple display example of the conventional dynamically reconfigurable processor.
Figure 15:
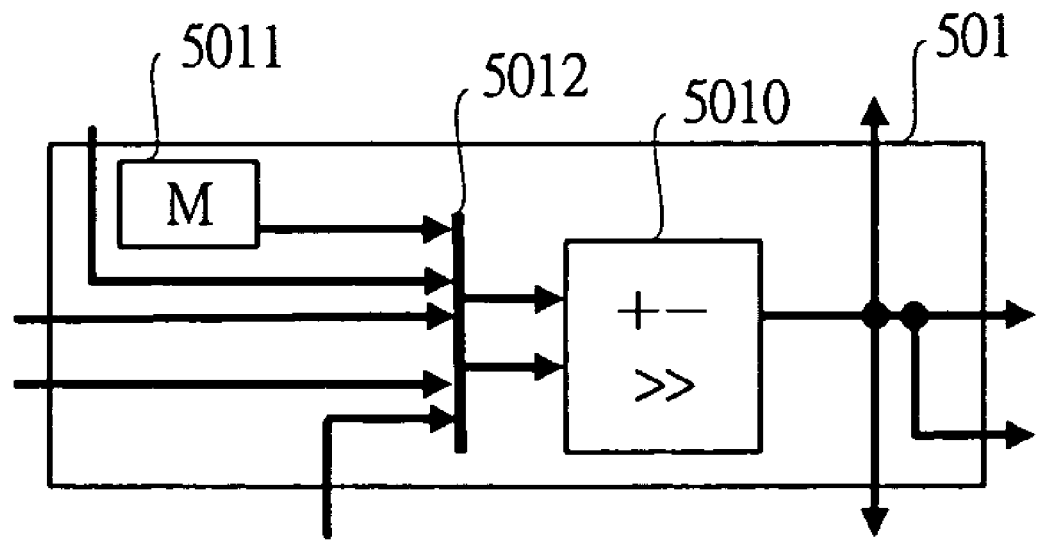
FIG. 15 is a diagram showing the structures of arithmetic circuits and wiring structures in FIG. 12.
Figure 15:
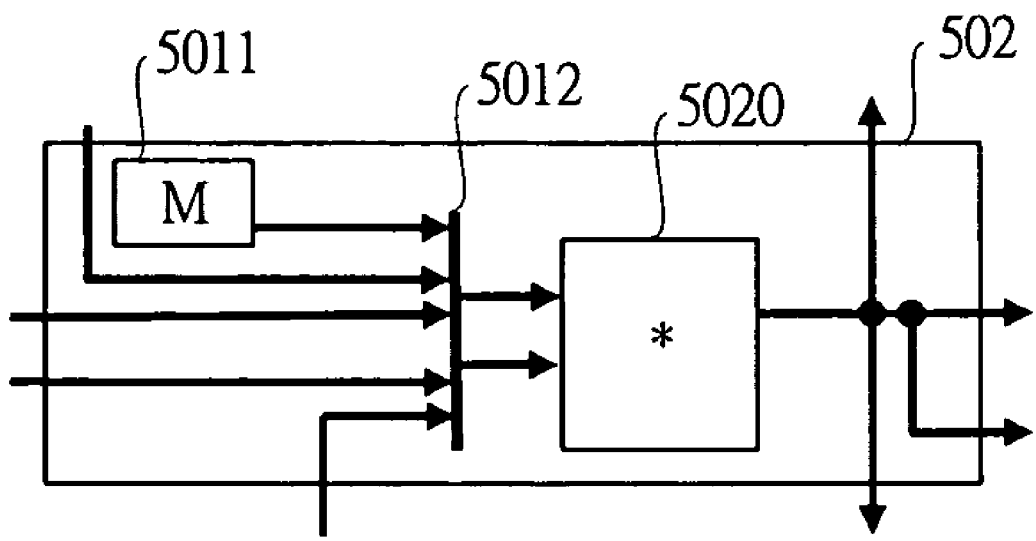
Figure 16:
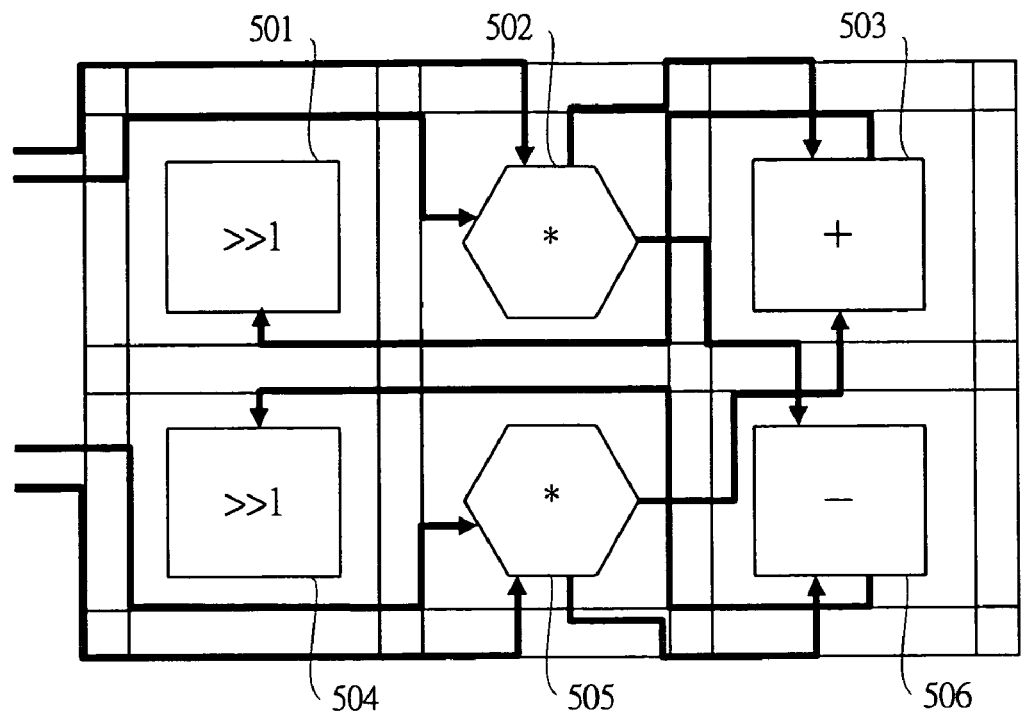
FIG. 16 is a diagram showing a failure example of mapping of the CDFG of FIG. 9 to the conventional dynamically reconfigurable processor.
Figure 17:
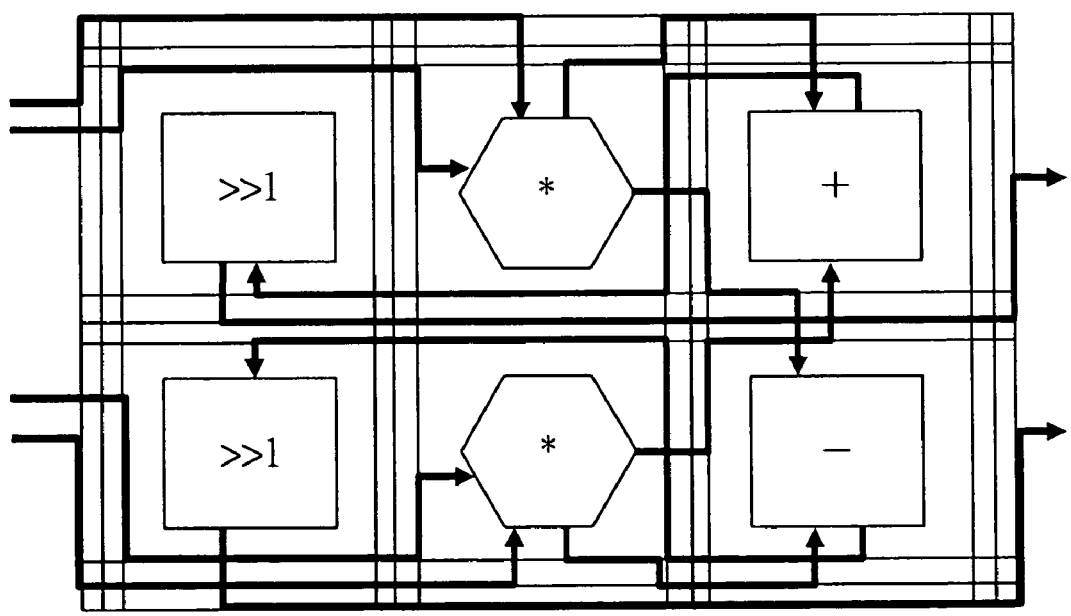
FIG. 17 is a diagram showing an example of mapping of the CDFG of FIG. 9 to a conventional dynamically reconfigurable processor in which the number of wires is increased.

The case where the CDFG of FIG. 9 is mapped to a conventional dynamically reconfigurable processor will be examined as a comparative example with reference to FIG. 12 to FIG. 17. FIG. 12 is a diagram showing an example of a conventional dynamically reconfigurable processor as a comparative example, FIGS. 13A to 13C are diagrams showing structures of wiring switches in FIG. 12, FIG. 14 is a diagram showing a simple display example of the conventional dynamically reconfigurable processor, FIG. 15 is a diagram showing the structures of arithmetic circuits and wiring structures in FIG. 12, FIG. 16 is a diagram showing a failure example of mapping of the CDFG of FIG. 9 to the conventional dynamically reconfigurable processor, and FIG. 17 is a diagram showing an example of mapping of the CDFG of FIG. 9 to a conventional dynamically reconfigurable processor in which the number of wires is increased.

In FIG. 12, the dynamically reconfigurable processor 100 is connected by wires 1102.

Each of the wires 1102 is connected via switch boxes 1100, in which each of four rhombuses represents a routing switch having a function to output any one or two inputs from the upper, lower, left, and/or right sides to any of the upper, lower, left, or right side. The details thereof will be described later with reference to FIGS. 13A to 13C.

Further, a junction part 1101 which also permits an unselected state between a switch and wires is also provided. The junction part 1101 is a switch which can select a wire connected to any of the two wires 1102 or can select neither of them.

For the arithmetic circuits 501 to 506, a programmer controls the flow of data on the wires in the arithmetic circuit array by setting the routing switches in the switch boxes 1100 by the configuration thereof, and it controls transmission of data between the arithmetic circuits and on wires by setting the switches in the junction parts 1101 by the configuration.

In FIGS. 13A to FIG. 13C, FIG. 13A is a diagram of an enlarged junction part 1101 of the switch which also allows the unselected state and wires. The junction part 1101 comprises a terminal 1200 not connected to any wire and a switch 1201. The switch 1201 connects a wire 1202 to any of wires 1203 and 1204 or connects the wire 1202 to the terminal 1200 in accordance with the configuration. The latter is equivalent to not connecting the wire 1202 to any wire.

FIG. 13B is a diagram of the enlarged switch box 1100. The switch box 1100 comprises one routing switch 1205 in the switch box.

FIG. 13C shoes a configuration example of the routing switch 1205. The routing switch 1205 is a switch 1206 having a function similar to that of the switch 1201 shown in FIG. 13A. However, the switch 1206 selects whether one wire is connected to another wire or not. A switch 1207 is a switch having a function similar to that of the switch 1201 shown in FIG. 13A. A switch 1208 is a switch which always selects either one of the wires which are adjacent to the lower right side thereof.

By virtue of the routing switch 1205, the data inputted from an arbitrary direction among the upper, lower, left, and right sides can be outputted to an arbitrary direction other than the inputted direction. Also, sometimes the data can be outputted in two directions at the same time. For example, the data inputted from the left side can be outputted in two directions, that is, to the upper side and the right or lower side. Also, two data transfer can be carried out in some cases. For example, outputting the data inputted from the left side to the upper side and outputting the data inputted from the right side to the lower side can be carried out at the same time. However, when the data inputted from the left side is to be outputted to the side other than the upper side (the right side or the lower side), other data transfer cannot be carried out at the same time because a wire 1209 is used.

A simple display example of the conventional dynamically reconfigurable processor shown in FIG. 12 is shown in FIG. 14. In FIG. 14, the wires between the arithmetic circuits except for those which are necessary are omitted.

Hereinafter, mapping of the CDFG shown in FIG. 9 is performed by using the arithmetic circuit array unit 50 of FIG. 14, and the fact that the mapping cannot be performed with two wires 1102 and the fact that the mapping can be performed when three wires 1102 are provided will be shown.

FIG. 15 shows the structure of the arithmetic circuits and the wiring structure in FIG. 12. FIG. 15 is the same as the arithmetic circuits shown in FIG. 7 except for that there is no through wire.

A failure example of the mapping of the CDFG of FIG. 9 to the conventional dynamically reconfigurable processor is shown in FIG. 16, in which thick lines represent flows of data. The four flows of data at the left end of FIG. 16 represent data inputted from the left-side local memory 80 to the arithmetic circuit array 50. Each of them passes through an upper-side or lower-side wire and reaches a multiplier circuit. The calculation results of the multiplier circuit 502 are outputted in the upper direction and the right direction, and they reach the arithmetic circuits 503 and 506, respectively. Similarly, the calculation results of the multiplier circuit 505 are outputted in the lower direction and the right direction and reach the arithmetic circuits 506 and 503, respectively. The calculation results in the arithmetic circuits 503 and 506 are respectively outputted in the upper direction and the lower direction and respectively reach the arithmetic circuits 501 and 504.

As described above, although all the operations are mapped, the mapping is a failure because there is no wire for outputting the results of the right shift to the right-side local memory 81.

Conventionally, in order to achieve successful mapping of the CDFG of FIG. 9 to the dynamically reconfigurable processor, the number of wires is increased as shown in FIG. 17.

As shown in FIG. 17, when the number of the wires 1102 is increased to three, the results of the right shift can be outputted to the right side as shown in the drawing, and therefore successful mapping of the CDFG of FIG. 9 can be achieved.

Hereinafter, the number of the wires used in the conventional technology shown in FIG. 12 and the total wire length in this embodiment shown in FIG. 2 will be compared with each other.

It is assumed that the arithmetic circuit array has m rows and n columns, each arithmetic circuit is square, the length of each side is L, and one wire comprises a b-bit wire.

In the conventional technology, the number of the wires 1102 is assumed to be a. In the conventional technology, the length of the wires connecting the arithmetic circuits to the wires 1102 and the length of the wires in the arithmetic circuits can be ignored.

Under these conditions, the total wire length in the conventional technology is $a*b*L*(2*m*n+m+n)$.

On the other hand, in the present invention, the number of used wires is assumed to be a/2. These wires represent the through wires in the arithmetic circuits.

The length of the wires serving as input/output of the ALUs in the arithmetic circuits and the wire mutually connecting the arithmetic circuits in the arithmetic circuit array can be ignored. Under these conditions, the total length of the through wires is $a*b*m*L*n/2$. Also, the total wire length of the wires 530 is $a*b*m*L*4$. Therefore, the total wire length according to the present invention is $a*b*m*L*(4+n/2)$.

Therefore, the total wire length according to this embodiment is shorter by $a*b*L*(3*m*(n-2)/2+n)$. This means that the wire area is smaller in this embodiment when the arithmetic circuit array has two or more columns.

Second Embodiment

In the first embodiment, the arithmetic circuit 501 and the arithmetic circuit 502 are connected to the arithmetic circuit 504 and the arithmetic circuit 505, respectively, by the vertical wires 520. In a second embodiment, however, wires and switches are added so that the arithmetic circuit 501 can be connected to the arithmetic circuit 502 or the arithmetic circuit 505 and similarly the arithmetic circuit 503 can be connected to the arithmetic circuit 502 or the arithmetic circuit 505.

<Configuration of a Dynamically Reconfigurable Processor>

Figure 18:
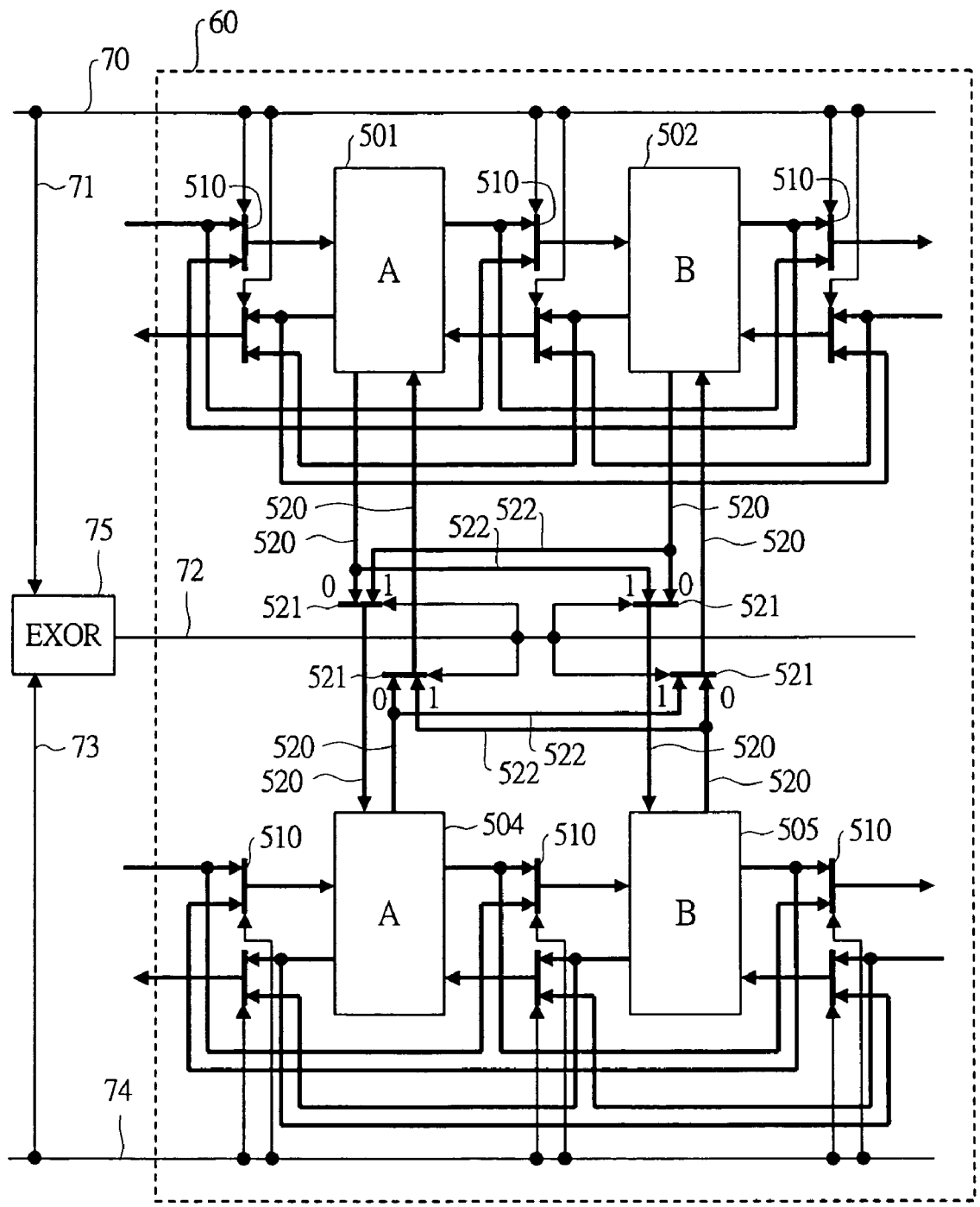
FIG. 18 is a configuration diagram showing the configuration of the dynamically reconfigurable processor according to the second embodiment of the present invention.

Next, the configuration of a dynamically reconfigurable processor according to the second embodiment of the present invention will be described with reference to FIG. 18. FIG. 18 is a configuration diagram showing the configuration of the dynamically reconfigurable processor according to the second embodiment of the present invention.

First of all, the difference between FIG. 2 of the first embodiment and FIG. 18 of the second embodiment will be described.

In FIG. 2 of the first embodiment, the arithmetic circuit 501 and the arithmetic circuit 502 are connected to the arithmetic circuit 504 and the arithmetic circuit 505, respectively, by the vertical wires 520.

In FIG. 18 of this embodiment, wires and switches are added so that the arithmetic circuit 501 can be connected to the arithmetic circuit 502 or 505, and similarly, the arithmetic circuit 503 can be connected to the arithmetic circuit 502 or 505.

In FIG. 18, the dynamically reconfigurable processor has the added switches 521 and the added wires 522. The added switches 521 constitute a switch group Ti.

Moreover, although only one arithmetic circuit position changing wire 70 is provided in FIG. 2 of the first embodiment, two arithmetic circuit position changing wires, i.e., the arithmetic circuit position changing wire 70 and an arithmetic circuit position changing wire 74 are provided in FIG. 18 of this embodiment, and setting can be separately performed for each of them.

A wire 71 is a wire branched from the arithmetic circuit position changing wire 70 and transmits the same signal as the arithmetic circuit position changing wire 70. A wire 73 is a wire branched from the arithmetic circuit position changing wire 74 and transmits the same signal as the arithmetic circuit position changing wire 74.

The signals from the wire 71 and the wire 73 are inputted to an arithmetic unit 75 which calculates an exclusive OR, and the operation result is inputted to the switches 521 via the wire 72.

The symbol "0" described in the vicinity of the switch 521 represents an input wire which is selected when the operation result of the exclusive OR is "0", and the symbol "1" represents an input wire which is selected when the operation result of the exclusive OR is "1".

In other words, when the signal of "1" is inputted to the switch 521 from the arithmetic unit 75, the signal from the wire 522, which is added in this embodiment, is outputted from the switch 521.

As a result, when the same value flows through the arithmetic circuit position changing wire 70 and the arithmetic circuit position changing wire 74, the arithmetic circuits in the vertical direction are connected in the same manner as FIG. 2. In other words, the arithmetic circuit 501 is connected to the arithmetic circuit 504, and the arithmetic circuit 502 is connected to the arithmetic circuit 505.

In this state, the same value flows through the arithmetic circuit position changing wire 70 and the arithmetic circuit position changing wire 74. Therefore, the connection order of the arithmetic circuit 501 and the arithmetic circuit 502 and the connection order of the arithmetic circuit 504 and the arithmetic circuit 505 are not changed. Accordingly, in this state, the connection is always the same as the connection of the first embodiment.

On the other hand, when different values flow through the arithmetic circuit position changing wire 70 and the arithmetic circuit position changing wire 74, the arithmetic circuits in the vertical direction are connected in a manner different from that of FIG. 2 of the first embodiment. More specifically, the arithmetic circuit 501 is connected to the arithmetic circuit 505, and the arithmetic circuit 502 is connected to the arithmetic circuit 504.

Therefore, for example, even when the arithmetic circuits in a first row are logically disposed in the order of the arithmetic circuit 501 and the arithmetic circuit 502 and the arithmetic circuits in a second row are logically disposed in the order of the arithmetic circuit 505 and the arithmetic circuit 504, in the relation between the arithmetic circuits in the vertical direction, since the arithmetic circuit 501 is connected to the arithmetic circuit 505 and the arithmetic circuit 502 is connected to the arithmetic circuit 504, the arithmetic circuits are set without inconsistency.

<Logical Circuit Configurations that Programmer can Select>

Next, logical circuit configurations that a programmer can select in the dynamically reconfigurable processor according to the second embodiment of the present invention will be described with reference to FIGS. 19A to 19D. FIGS. 19A to 19D are diagrams showing the logical circuit configurations that a programmer can select in the dynamically reconfigurable processor according to the second embodiment of the present invention.

First of all, it is assumed that the switches 510 in FIG. 18 which control the switching of the arithmetic units in the horizontal direction select the upper-side wires when the value which flows through the arithmetic circuit position changing wire 70 is 0 and select the lower-side wire when it is 1.

When signals "0" and "0" are respectively given to the wire 70 and the wire 74, the exclusive OR thereof is "0", and the arithmetic circuit 501 and the arithmetic circuit 502 are connected to the arithmetic circuit 504 and the arithmetic circuit 505, respectively. Therefore, the logical circuit configuration viewed from the programmer is given by FIG. 19A. Herein, it is assumed that addition is selected in the arithmetic circuits of the type A, and multiplication is selected in the arithmetic circuits of the type B.

On the other hand, when signals "1" and "1" are respectively given to the wire 70 and the wire 74, the exclusive OR thereof is "0", and the arithmetic circuit 502 and the arithmetic circuit 501 are connected to the arithmetic circuit 505 and the arithmetic circuit 504, respectively. Therefore, the logical circuit configuration viewed from the programmer is given by FIG. 19B.

Next, when signals "1" and "0" are given to the wire 70 and the wire 74, respectively, the exclusive OR thereof is "1", and the arithmetic circuit 502 and the arithmetic circuit 501 are connected to the arithmetic circuit 504 and the arithmetic circuit 505, respectively. Therefore, the logical circuit configuration viewed from the programmer is given by FIG. 18C.

Finally, when signals "0" and "1" are given to the wire 70 and the wire 74, respectively, the exclusive OR thereof is "1", and the arithmetic circuit 501 and the arithmetic circuit 502 are connected to the arithmetic circuit 505 and the arithmetic circuit 504, respectively. Therefore the logical circuit configuration viewed from the programmer is given by FIG. 19D.

As described above, since the various circuit configurations shown in FIG. 19A to FIG. 19D can be set, the programmer can remarkably readily perform programming in the dynamically reconfigurable processor of this embodiment.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a dynamically reconfigurable processor in which the configuration thereof can be dynamically changed. More particularly, the invention can be applied to a processor having a plurality of arithmetic circuits and a plurality of inter-arithmetic-circuit wires as constituent elements.

What is claimed is:

1. A dynamically reconfigurable processor comprising:
   an arithmetic circuit group Ui comprised of arithmetic circuits of a type Ai (i=1, 2, ..., N);
   an arithmetic circuit group Vi comprised of a part of arithmetic circuits which are included in said arithmetic circuit group Ui and an arithmetic circuit group of a type B which is connected thereto and different from said arithmetic circuit of the type Ai;
   inter-arithmetic-circuit wires Xi mutually connecting said arithmetic circuits of the type Ai and said arithmetic circuits of the type B;
   wires Zi which are added to said inter-arithmetic-circuit wires Xi so as to mutually connect the arithmetic circuits in said arithmetic circuit group Vi in an order different from that of said inter-arithmetic-circuit wires Xi; and
   a switch group Si which causes either one of said inter-arithmetic-circuit wire Xi or said wire Zi to be active.

2. The dynamically reconfigurable processor according to claim 1, further comprising a switch group Ti which changes the inter-arithmetic-circuit wires mutually connecting couples composed of said arithmetic circuits of the type Ai and said arithmetic circuits of the type B connected by said inter-arithmetic-circuit wires Xi in said arithmetic circuit group Vi, in association with a state of said switch group Si.

3. A processor control method which controls a dynamically reconfigurable processor comprising: an arithmetic circuit group Ui comprised of arithmetic circuits of a type Ai (i=1, 2, ..., N); an arithmetic circuit group Vi comprised of a part of arithmetic circuits which are included in said arithmetic circuit group Ui and an arithmetic circuit group of a type B which is connected thereto and different from said arithmetic circuit of the type Ai; inter-arithmetic-circuit wires Xi mutually connecting said arithmetic circuits of the type Ai and said arithmetic circuits of the type B; wires Zi which are added to said inter-arithmetic-circuit wires Xi so as to mutually connect the arithmetic circuits in said arithmetic circuit group Vi in an order different from that of said inter-arithmetic-circuit wires Xi; and a switch group Si which causes either one of said inter-arithmetic-circuit wire Xi or said wire Zi to be active,
   wherein, based on information of a logical circuit configuration for operating said dynamically reconfigurable processor, said switch group Si is controlled to change the connection order of said arithmetic circuits of the type Ai and said arithmetic circuits of the type B.

4. A processor control method which controls a dynamically reconfigurable processor comprising: an arithmetic circuit group Ui comprised of arithmetic circuits of a type Ai (i=1, 2, ..., N); an arithmetic circuit group Vi comprised of a part of arithmetic circuits which are included in said arithmetic circuit group Ui and an arithmetic circuit group of a type B which is connected thereto and different from said arithmetic circuit of the type Ai; inter-arithmetic-circuit wires Xi mutually connecting said arithmetic circuits of the type Ai and said arithmetic circuits of the type B; wires Zi which are added to said inter-arithmetic-circuit wires Xi so as to mutually connect the arithmetic circuits in said arithmetic circuit group Vi in an order different from that of said inter-arithmetic-circuit wires Xi; a switch group Si which causes either one of said inter-arithmetic-circuit wire Xi or said wire Zi to be active; and a switch group Ti which changes the inter-arithmetic-circuit wires mutually connecting couples composed of said arithmetic circuits of the type Ai and said arithmetic circuits of the type B connected by said inter-arithmetic-circuit wires Xi in said arithmetic circuit group Vi, wherein, based on information of a logical circuit configuration for operating said dynamically reconfigurable processor, said switch group Si is controlled to change the connection order of said arithmetic circuits of the type Ai and said arithmetic circuits of the type B, and said switch group Ti is controlled in association with a control signal of said switch group Si to change the inter-arithmetic-circuit wires mutually connecting couples composed of said arithmetic circuits of the type Ai and said arithmetic circuits of the type B connected by said inter-arithmetic-circuit wires Xi in said arithmetic circuit group Vi, in association with a state of said switch group Si.

\* \* \* \* \*